United States Patent [19]

Kraus et al.

[11] Patent Number: 5,676,332
[45] Date of Patent: Oct. 14, 1997

[54] RECYCLABLE MOTION PICTURE REEL

[76] Inventors: James Kraus, 1377 N. Serrano Ave., Hollywood, Calif. 90027; Ranjiv Goonetilleke; Cesar Fernandez, both of 4154 Norse Way, Long Beach, Calif. 90808

[21] Appl. No.: 632,061

[22] Filed: Apr. 15, 1996

[51] Int. Cl.[6] .................................................. B65H 75/14
[52] U.S. Cl. ............................. 242/608.6; 242/609
[58] Field of Search .................................. 242/607, 608, 242/608.2, 608.6, 609, 609.1, 613, 614

[56] References Cited

U.S. PATENT DOCUMENTS

| | | | |
|---|---|---|---|
| 1,429,692 | 9/1922 | Passavanti | 242/608.2 |
| 2,667,257 | 1/1954 | Hurtado | 242/608.6 |
| 2,778,581 | 1/1957 | Lorenz | 242/609 |
| 3,041,005 | 6/1962 | Wallace | 242/609.1 |
| 3,145,823 | 8/1964 | Spradlin | 242/608 |
| 3,173,536 | 3/1965 | Gittler et al. | 242/609.1 |
| 4,515,323 | 5/1985 | Rood et al. | 242/609 |
| 4,610,555 | 9/1986 | Di Luco | 242/608.2 |
| 4,629,136 | 12/1986 | Vallance | 242/608.6 |
| 5,114,089 | 5/1992 | Posso | 242/608.6 |
| 5,531,399 | 7/1996 | Weisburn et al. | 242/608.6 |

FOREIGN PATENT DOCUMENTS

| | | | |
|---|---|---|---|
| 1 211 461 | 2/1966 | Germany | 242/608.2 |
| 1-98575 | 4/1989 | Japan | 242/608.6 |

*Primary Examiner*—John P. Darling
*Attorney, Agent, or Firm*—Charles H. Thomas

[57] ABSTRACT

A motion picture film reel is comprised of a pair of identical retaining members each formed with a flat, side cheek-plate member having a central axis of rotation and a hub-engaging region. An axially extending portion projects from each central, hub-engaging region in generally perpendicular alignment therewith. Each axially extending portion includes a base with a pair of diametrically opposed channels extending lengthwise along the base and a pair of resilient, diametrically opposed prongs. The prongs both have radially outwardly directed catches thereon. The prongs are inserted through a central, axial opening in a disk-shaped hub from the opposite sides thereof. The opposite edges of the core on the opposite sides of the hub form latching ledges so that the catches on the prongs releasably engage the latching ledges on the two opposite sides of the hub. The retaining members are thereby held releasably engaged to the central hub located therebetween. One or both retaining members can be removed simply by pressing the catches at the ends of the prongs together and pulling the retaining members apart from each other.

14 Claims, 7 Drawing Sheets

RECYCLABLE MOTION PICTURE REEL

BACKGROUND OF THE INVENTION

1. Field of the Invention

The present invention relates to motion picture reels upon which motion picture film is wound and unwound as it is passed through a motion picture projector for presentation of a motion picture to a viewing audience.

2. Description of the Prior Art

Motion pictures are created by a series of photographs taken rapidly in sequence and arranged on a length of film. The film is wound on a motion picture reel and fed through a motion picture projector at a predetermined speed that is rapid enough to produce the illusion of actual movement of the figures in the sequence of photographs as the photographs are projected on the screen. The film is wound on the motion picture reel in a helical fashion about a hub that is fixed between a pair of much larger, narrow, planar retaining members. As film is advanced through the projector it is pulled off of one reel, advanced through the projector, and wound on a take-up reel. At the conclusion of presentation of the motion picture, the film is rewound back onto the original reel from which it was drawn during the presentation process.

In the motion picture industry, motion pictures are timed for release at a great number of locations during and immediately following very expensive promotional advertising campaigns. To maximize the number of viewers in the audiences, a great number of copies of a motion picture are created and are then distributed concurrently to numerous different movie theaters at the height of interest created by the advertising campaign. This distribution technique necessitates the creation of a great number of copies of each motion picture at the time of distribution. Each copy requires a separate, dedicated motion picture film reel.

During and immediately following the period of advertising promotion, a motion picture is widely exhibited at many different locations at the same time. Following the promotional period, however, the multitude of copies of the motion picture film produced and previously required are no longer necessary, and indeed, constitute a problem.

It is highly desirable for excess copies of motion picture films to be destroyed rather than stored. Films to be stored for later use must be maintained under hermetically sealed conditions so as to avoid degradation of the film copy. While certainly a limited number of copies of the film are preserved for possible recirculation and for use as masters for the possible reproduction of additional copies at a future time, the great majority of the copies of motion pictures produced are destroyed following a limited period of wide-spread exhibition in movie theaters. The expense of storing the very large number of copies which were once necessary in order to exhibit the motion picture at a multitude of different movie theaters cannot be justified. The cost of protection and storage of each copy of the motion picture film far outweighs the incremental cost of producing each motion picture copy. Moreover, when copies of motion picture films are stored they must be safeguarded against misappropriation. As a consequence, destruction of the excess number of copies of a motion picture film following circulation is a highly desirable alternative to storage.

Originally, motion picture film reels were made of metal. At the time of destruction the motion picture film was drawn off of such a reel and cut into small, unusable pieces for disposal. However, this was a very time consuming, and therefore expensive process.

Because of the lengthy time required to unwind a copy of a motion picture film for destruction, quicker destruction methods were devised. One method was to construct the reel upon which the film was wound of a plastic material that could be broken in order to retrieve the film for destruction without unwinding it when the copy of the film became redundant. As a consequence, the film did not have to be pulled lengthwise off of the reel by rotating the reel for a lengthy period of time, but instead could be pulled transversely off of the hub and destroyed without unwinding it. However, since the film reel had to be made strong enough to withstand repeated transport and use and reuse during exhibition of the motion picture, the reel had to be constructed in a reasonably sturdy manner. As a result, smashing of the reel was laborious and also at times difficult. Moreover, the cost of replacing these reels for use with other motion picture films was considerable.

More recently, motion picture reels have been produced which are formed of component members that are releasably attached to each other. Each of these members is formed of a broad cheek plate and a portion of a central hub which can be releasably fastened together. Originally the two component portions of the reel were screwed together. When the copy of the motion picture film wound thereon was no longer desired, the components of the reel were unscrewed from each other to provide complete access to the film wound on the central hub. However, the parts of this type of reel could accidentally become unscrewed during the time the film was in distribution.

A further type of motion picture film reel is now being produced in which the two halves of the motion picture reel included interlocking fingers at the hub that flex resiliently to interlock with a corresponding structure projecting from the other half of the reel. These two retaining members each include a metal insert into which a key is inserted. When the key is rotated, the fingers are deflected from engagement with the other portion of the reel, so that the two reel portions can be pulled apart. Each of the reel halves also includes either portions of an integrally formed hub portion upon which the film is wound or a hub insert. In either case a key is necessary to work within the metal insert so as to detach the reel halves from each other.

Furthermore, with this conventional design the metal insert becomes a problem in ultimately disposing of such reels once they have outlived their useful lives. The metal insert cannot be readily separated from the plastic. Therefore, recycling of the plastic portion of the reel, which represents by far the greater portion of the structure of the reel, becomes very difficult since the metal insert must first be removed.

SUMMARY OF THE INVENTION

A primary object of the present invention is to provide a motion picture reel which can not only readily be taken apart, but which is also completely recyclable. Motion picture reels of the present invention involve no metal parts whatsoever. To the contrary, the reel of the invention is formed completely of plastic which can be totally recycled without separation from any metal member at the end of its useful life. Once the reel becomes worn to the point where it is no longer serviceable, the component members of the reel are merely melted down so that the structure of the reel is totally recyclable.

A further object of the invention is to provide a motion picture reel which is completely reusable, over and over again. Unlike some prior systems, the reel of the invention need not be broken in order to remove the film without unwinding it. Quite to the contrary, the component members of the motion picture reel of the invention can be taken apart and reassembled many, many times, thus giving the reel a greatly enhanced useful life.

A further object of the invention is to produce a motion picture reel in which the retainer members are identical in construction, even though they are oriented relative to a hub disposed therebetween in mirror image fashion. Due to the unique construction of the reel of the invention, the retaining members are releasably connected to a central hub from opposites sides of the hub by orienting structurally identical retaining members at an angular displacement of ninety degrees relative to each other. Both of the retaining components then can be attached to a common hub member, from opposite sides of the hub member.

A further object of the invention is to provide a motion picture reel in which the component members of the reel remain releasably attached to each other throughout the use of the reel for transport, storage, and display of a film thereon, but which can also be quickly and easily disassembled from each other without the use of any special purpose tool. Indeed, the component members can be separated from each other without any tools whatsoever, using only a person's fingers.

A further object of the invention is to provide a motion picture reel in which a single hub member may be utilized in conjunction with two identical, retaining members. The two, side retaining members for each motion picture film reel can thereby be produced from a single mold.

The motion picture reel can be repeatedly assembled and disassembled without destruction. Moreover, when its useful life is ended it is completely recyclable since it is formed entirely of plastic without metal parts of any type.

In one broad aspect the present invention may be considered to be a motion picture film reel comprising separate components that are releasably engageable together. These components include a pair of side retainers each formed with a flat, planar member having an outer retainer rim with a circular perimeter and a hub-engaging region defining an axis and centered within the rim, and including at least one resilient prong defining a catch thereon. The prong extends out of the plane of the flat, planar member. In addition, a disk-shaped hub is also provided. The hub has opposing sides and defines at least one aperture therethrough for receiving the resilient prongs from both of its opposing sides. The hub further defines latching ledges for releasably engaging the catches on the prongs.

In the preferred embodiment the aperture in the hub is comprised of a single, central, axial aperture. Each of the side retainers include a pair of prongs. The prongs in each pair are located diametrically opposite each other within their respective hub regions. All of the prongs pass through the same central aperture in the hub. Furthermore, the pairs of prongs of the pair of side retainers are angularly offset from each other by ninety degrees. This allows identical retaining members to be utilized between a common hub in mirror image fashion.

The hub preferably has a hub rim having a cylindrical outer surface surrounding the core through which the central, axial aperture is defined. A web extends transversely relative to the reel axis and joins the core to the hub rim. The web is oriented perpendicular to the central core of the hub.

At least one locator aperture is preferably formed through the web. Also, the hub-engaging regions of both of the flat, planar members of the pair of side retainers are each provided with at least one locator pin extending out of the planes of their respective, flat, planar members. Preferably, there are a pair of locator pins on each retaining member, and a corresponding pair of locator apertures in the web of the hub.

To assemble the motion picture film reel the side retainers are positioned on opposite sides of the hub with the prongs of both retainers directed inwardly toward the hub and toward each other. The side retainers are then pressed toward the hub. The locator pins of both side retainers fit into the locator apertures in the web of the hub when the pairs of prongs on the two retainers are angularly offset from each other by an angle of ninety degrees. The fit of the locator pins into the locator apertures permits the catches on the prongs to engage the latching ledges on the hub. The web otherwise interferes with the advancement of the locator pins so as to prevent the catches from engaging the latching ledges if the pairs of prongs on the respective retaining members are not offset from each other by ninety degrees.

The two retaining members are preferably structurally identical to each other. Each of the retaining members is further preferably provided with centering projections that extend out of the planes of the flat, planar members. These centering projections engage the rim of the hub so as to center the hub coaxially relative to the hub-engaging regions of the flat, planar members.

In the preferred embodiment of the invention the outer cylindrical rim of the hub defines a longitudinal film insertion slot through its structure. Also, the flat, planar members of the side retainers define film-end access gaps therein. These film-end access gaps are angularly offset forty-five degrees from the diametric alignment of the pair of prongs extending out of the plane of the flat, planar member. With this construction the film-end access gaps reside in angular alignment with each other and with the film insertion slot in the hub rim when the catches are engaged with the latching ledges. This is because the retainers, though identical in construction, face each other, and are rotated ninety degrees relative to each other when they are attached to the hub from opposite sides of the hub.

The catches on the prongs in each of the pairs of prongs are directed radially outwardly away from each other. The catches are located on the distal tips of the prongs remote from the hub-engaging regions. These distal prong tips define cam surfaces. In this way the prongs in each pair of prongs are deflected radially inwardly toward each other as the distal tips of the prongs enter the central, axial aperture in the hub. The prongs resiliently spring radially outwardly upon reaching the latching ledges, to thereby releasably engage the catches on the tips of the prongs with the sides of the hub.

To separate the motion picture film reel of the invention, one need merely squeeze the tips of the prongs toward each other and toward the axial center of the reel while pulling the side retainers apart from each other in opposite directions along the axis of the reel. Once the tips of the prongs have been pressed toward each so that the catches are located radially inwardly from the latching ledges, the retainers can easily be drawn apart from each other and the hub removed from between the retainers.

In another broad aspect the invention may be considered to be a motion picture reel having an axis of rotation and formed of separable and releaseably engaged components. These components include a pair of laterally confining retaining members. Each retaining member includes a planar portion that defines a central, hub-engaging region, spokes that radiate from the hub-engaging region, and a retainer rim that has a circular perimeter concentrically surrounding the hub-engaging region. Each retaining member also includes an axial portion having at least one resilient prong projecting away from the hub-engaging region. Each prong includes a catch thereon. A hub is provided between the retainers and has a cylindrical outer surface and defines at least one opening through both of its opposing sides. The opening receives the prongs of each of the retaining members which project therethrough from the opposing sides of the hub. The hub also defines latching ledges for releaseably engaging the catches on the prongs.

The invention may be described with greater clarity and particularity by reference to the accompanying drawings.

DESCRIPTION OF THE EMBODIMENT

Figure 1:
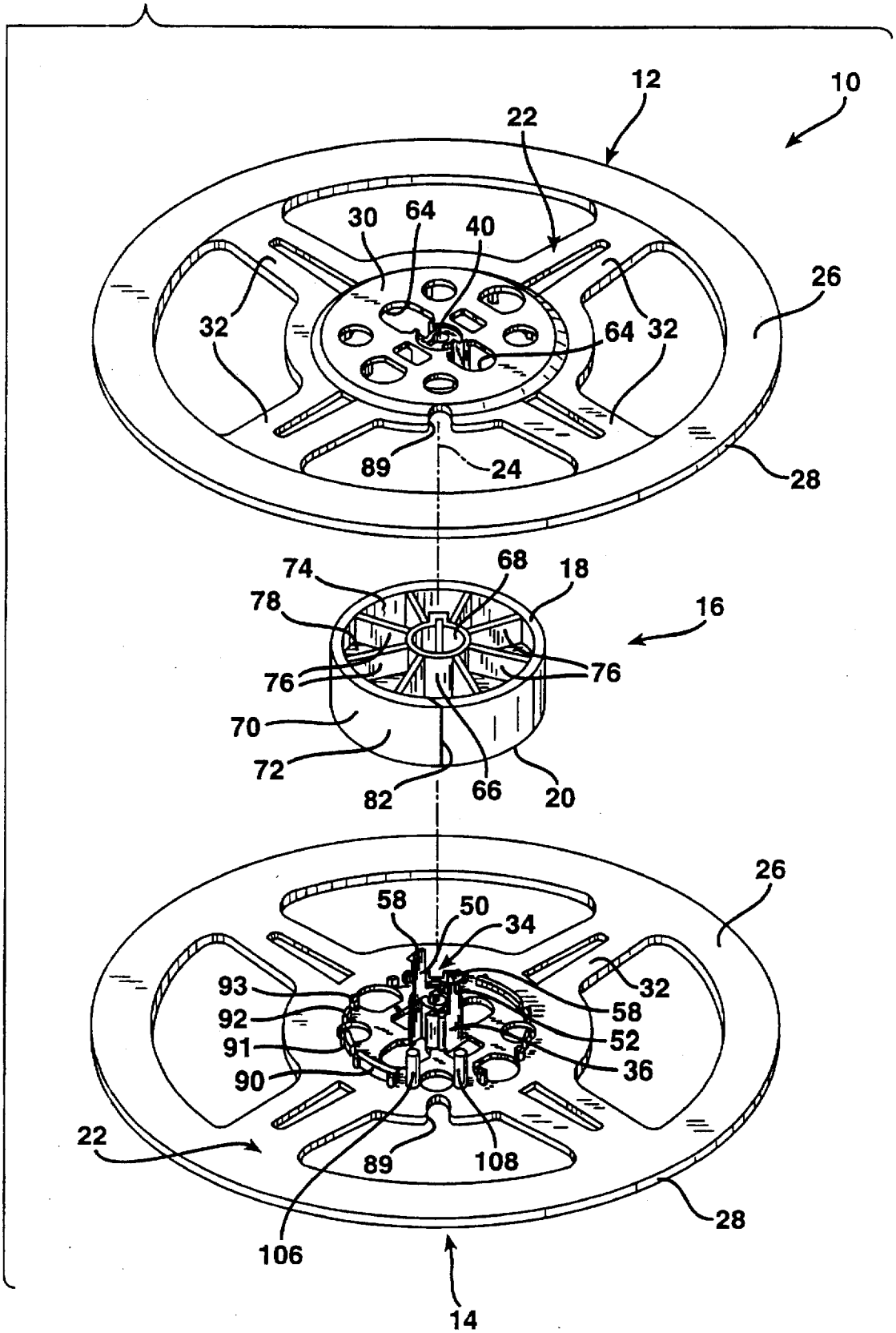
FIG. 1 is a exploded perspective view illustrating a preferred embodiment of the invention.

FIG. 1 illustrates a motion picture film reel 10 constructed according to the invention. The motion picture film reel 10 is comprised of a pair of structurally identical retaining members 12 and 14 and a generally disk-shaped hub 16 located therebetween. The hub 16 has opposite sides 18 and 20. All of the component members 12, 14, and 16 of the motion picture film reel 10 are formed of acronitrile-butadyene-styrene (ABS).

The retaining members 12 and 14 are identical to each other in construction. Each of the retaining members 12 and 14 is formed with a flat, side cheek-plate member 22 having a central axis of rotation 24. Each of the cheek-plate members 22 defines a retainer rim 26 with an outer, circular perimeter 28 and a central, hub-engaging region 30. The rim 26 is joined to the hub-engaging region 30 by four flat spokes 32, located at ninety degree intervals about each of the retaining members 12 and 14. The spokes 32 radiate from the hub-engaging region 30 to meet the retaining member rim 26. The rim 26 concentrically surrounds the hub-engaging region 30.

Figure 3:
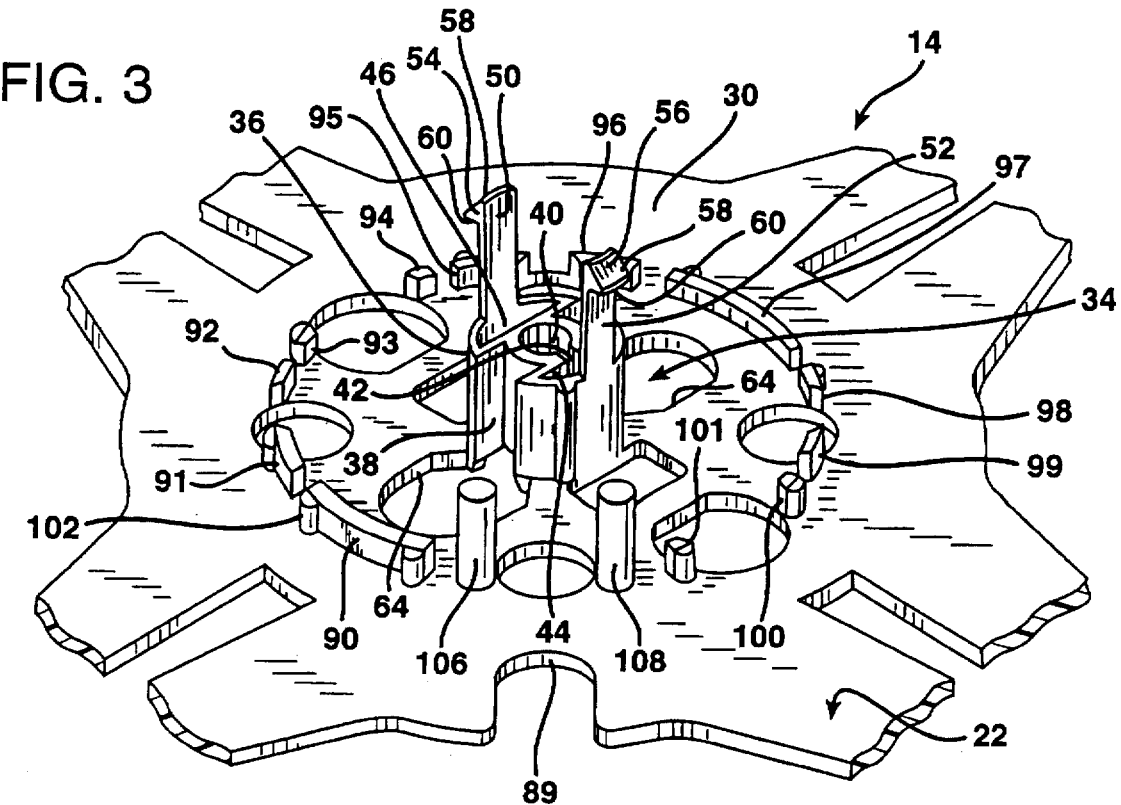
FIG. 3 is a perspective detail of the inner surface of the hub-engaging portion of the other retaining member shown in FIG. 1.

As best illustrated in FIG. 3, each of the central, hub-engaging regions 30 has on its inner surface an axial portion 34 that includes an annular base 36 having a generally cylindrical outer surface upon which small, radially outwardly projecting, longitudinally extending ribs are defined. A pair of diametrically opposed, radially inwardly extending channels 38 are defined into the structure of the base 36 parallel to the axis 24. The base 36 of the axial portion 34 projects away from the hub-engaging region 30 and is oriented generally perpendicular thereto. The annular base 36 defines therewithin a central, axial opening 40 having a generally cylindrical interior wall split along one side by a gap 42 that leads into a segment-shaped cavity 44. Opposite the gap 42 the base 36 defines another closed, segment-shaped cavity 46.

The axial portion 34 also includes a pair of elongated, resilient prongs 50 and 52 disposed adjacent the segment-shaped cavities 44 and 46. The prongs 50 and 52 are located diametrically opposite each other relative to the axis of rotation 24. The angular orientation of the prongs 50 and 52 is at right angles to the alignment of the channels 38. The prongs 50 and 52 project further from the hub-engaging region 30 than the bases 36 from which they extend.

The distal tips of the prongs 50 and 52 remote from the hub-engaging regions 30 form catches 54 and 56. The catches 54 and 56 have radially outwardly facing cam surfaces 58, inclined downwardly and outwardly toward the hub-engaging regions 30 at an angle of approximately forty-five degrees. The catches 50 and 52 also define flat, downwardly facing, bearing undersurfaces 60.

Figure 2:
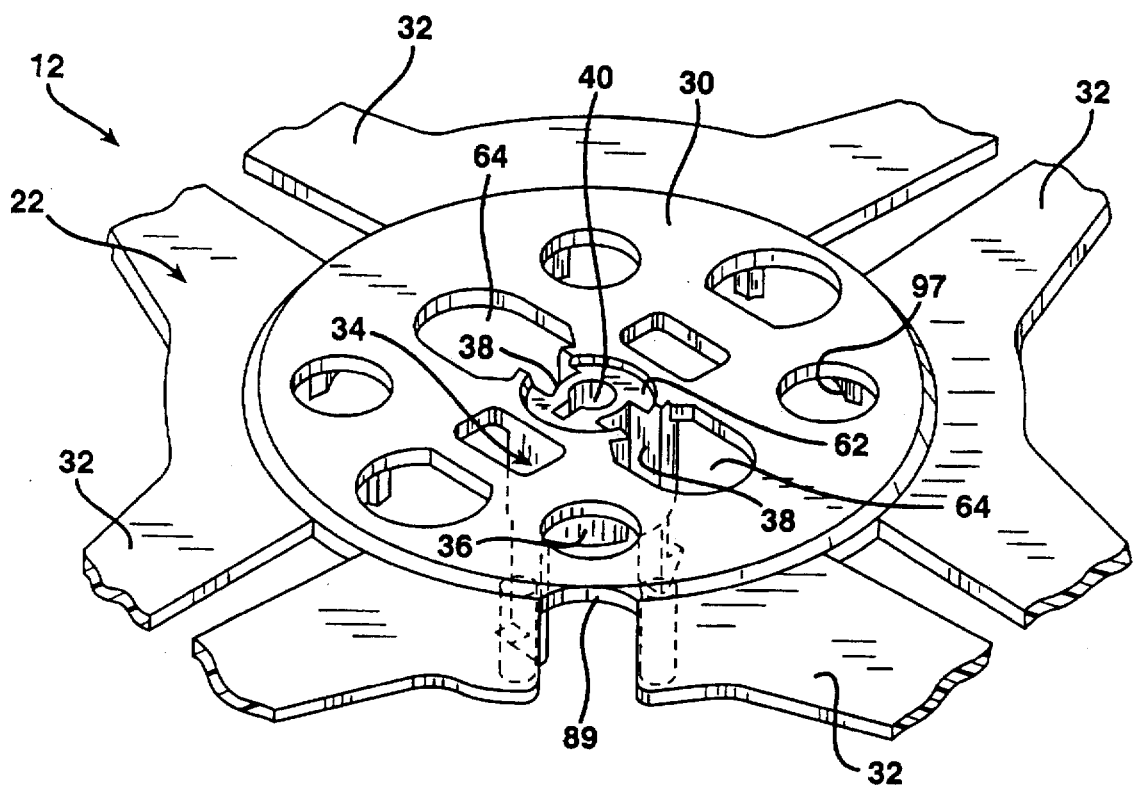
FIG. 2 is a prospective detail of the outer surface of the hub-engaging portion of one of the retaining members shown in FIG. 1.
Figure 5:
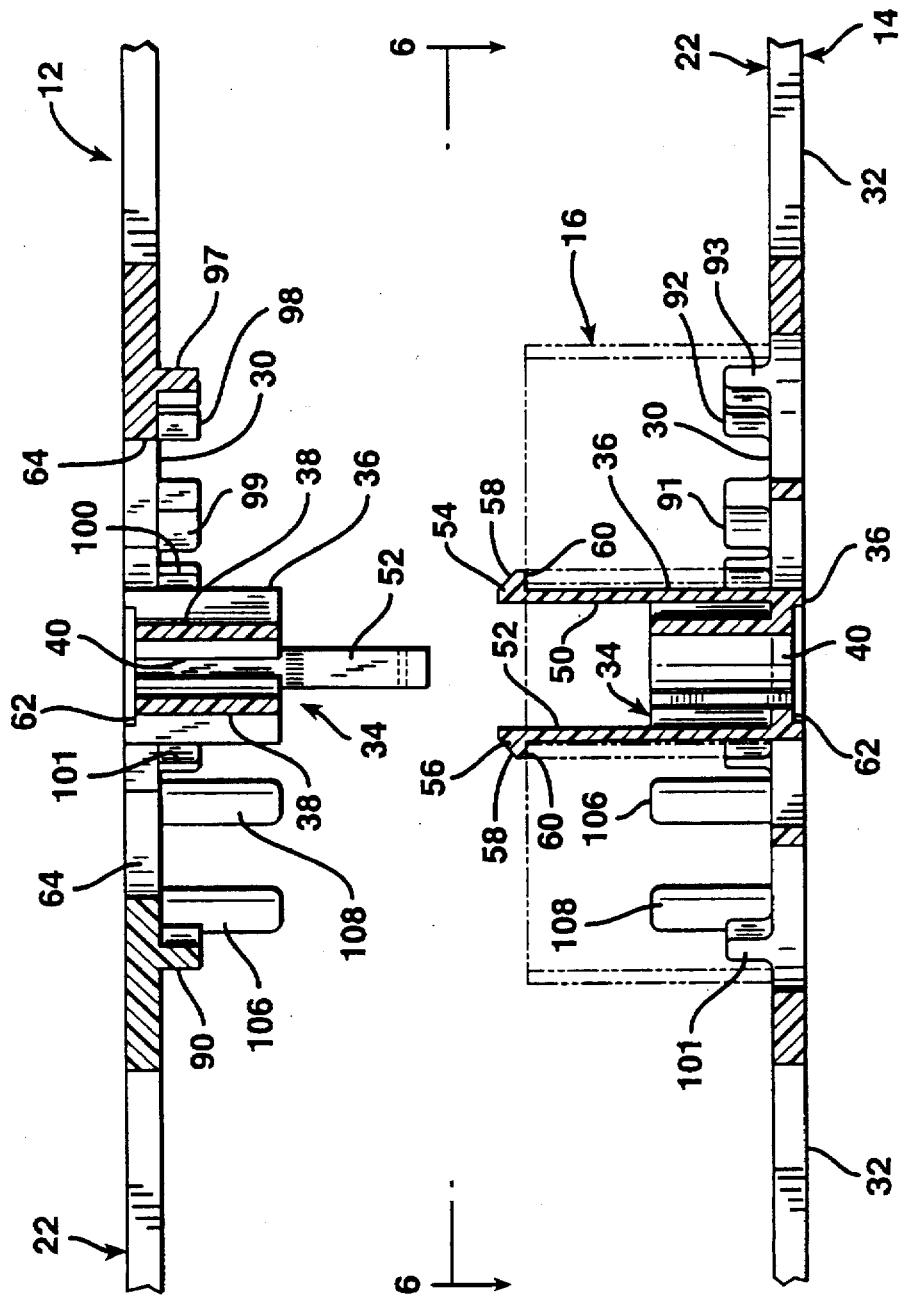
FIG. 5 is a sectional elevational view of the hub-engaging regions of the retaining members with the hub shown in phantom releasably engaged on one of the hub-engaging regions.
Figure 8:
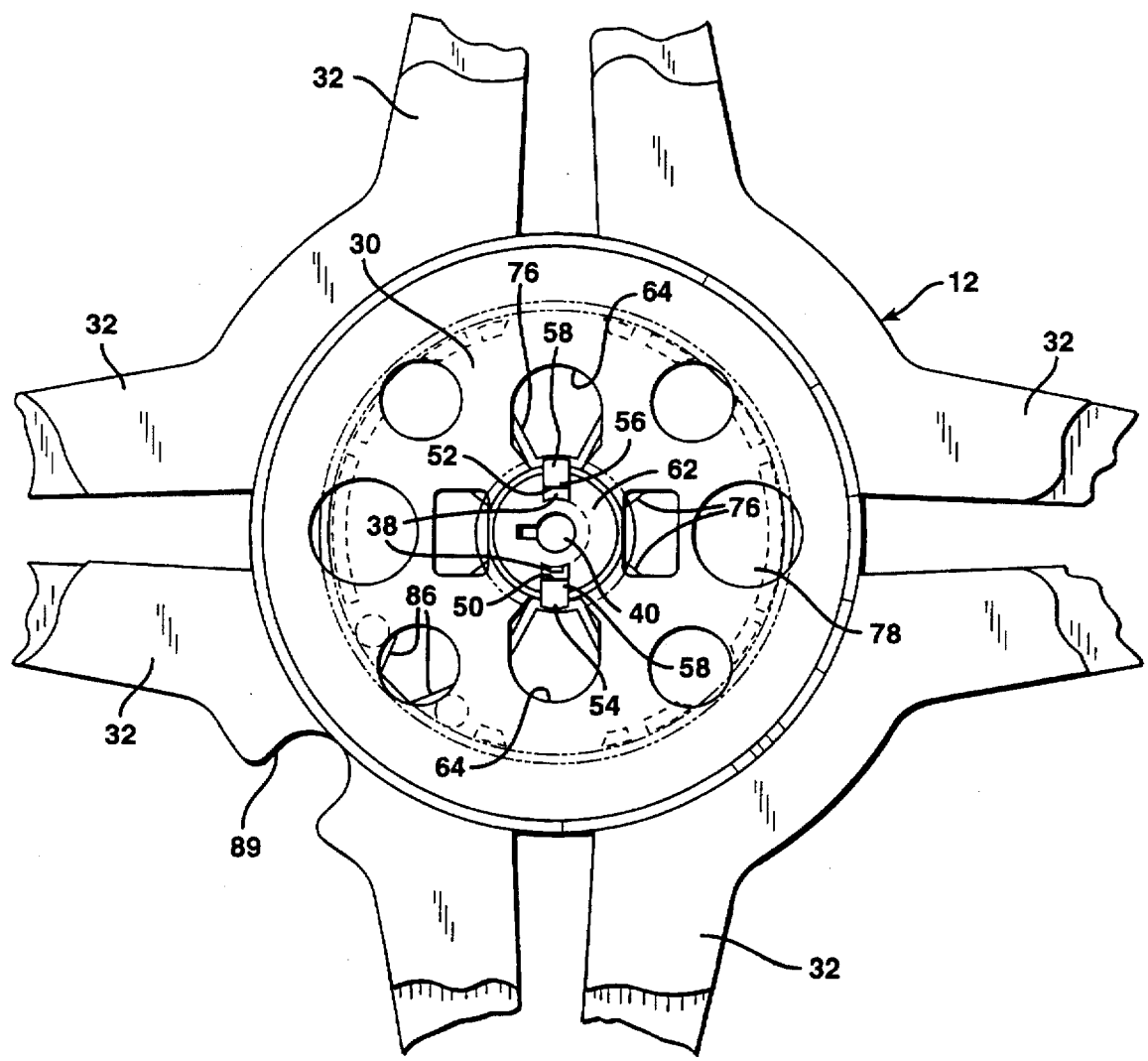
FIG. 8 is a top plan view taken along the lines 8—8 of FIG. 7.

As best illustrated in FIG. 2, the outwardly facing surfaces of the hub-engaging regions 30 define at their axial centers a recessed area 62 which is generally circular in configuration, but which is notched out where the channels 38 intersect it. The channels 38 have mutually parallel side walls and are of a width only slightly greater than the width of the prongs 50 and 52, so that the side walls of the channels 38 engage the sides of the prongs 50 and 52 when the component parts of the reel 10 are assembled, as shown in FIGS. 5 and 8. The engagement of the prongs 50 and 52 within the channels 38 holds the retaining members 12 and 14 and prevents virtually any relative rotational movement therebetween.

Adjacent the recessed areas 62 there are relatively large catch access openings 64 defined within the structure of the hub-engaging region 30. The catch access openings 64 are arranged in communication with the notches defined in the area 62 by the intersection of the channels 38 therewith. The catch access openings 64 are preferably about seven-eighths of an inch in length as measured in a radial direction and about three-quarters of an inch in width as measured in a transverse direction. The catch access openings 64 provide access for the tips of the thumb and forefinger of a user's hand to squeeze the catches 32 together to disassemble the motion picture film reel 10.

Figure 6:
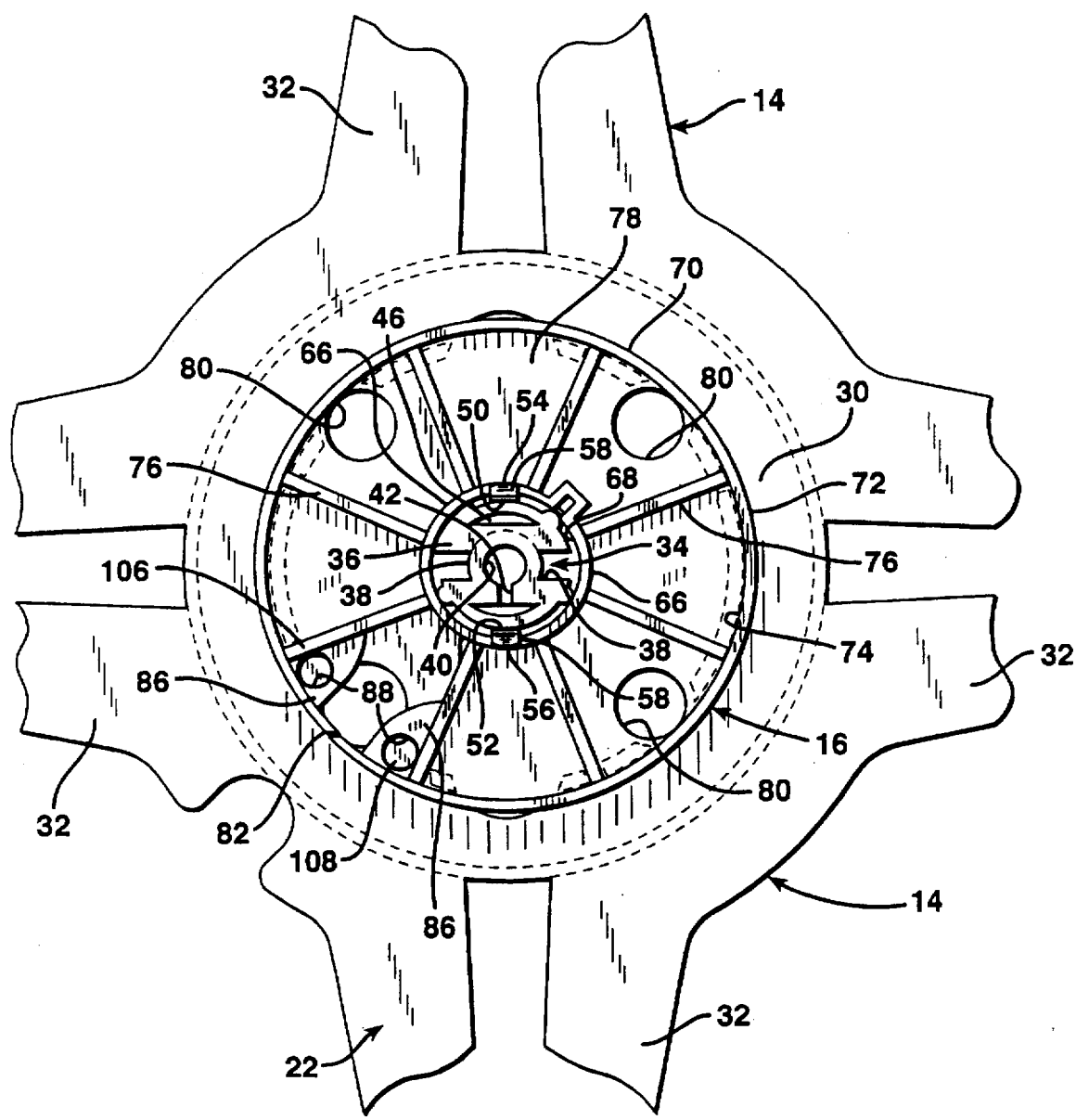
FIG. 6 is a plan detail taken along the lines 5—5 of FIG. 5.

The hub 16 is formed with a central, generally cylindrical core 66 through which a central, axial opening 68 is defined as depicted in FIGS. 1 and 6. The hub 16 also includes an annular hub rim 70 having a cylindrical outer surface 72 and an cylindrical inner surface 74. The cylindrical outer surface 72 has a diameter of four inches, which is the standard outer hub surface diameter for motion picture film reels in the motion picture industry. The rim 70 is set radially outwardly from the core 66 and is joined thereto by eight radial partitions 76 that extend between the inner surface 74 of the hub rim 70 and the outer surface of the core 66. The radial partitions 76 divide the area between the core 66 and the rim 70 into sectors.

The hub 16 is also constructed with a web 78 that is oriented perpendicular to the axis of the hub 16. The web 78 is formed with three circular apertures 80. A film insertion slot 82 is defined through the structure of the hub rim 70 between the outer surface 72 and inner surface 74 thereof. The film insertion slot 82 resides at approximately the center of one of the sectors delineated by the partitions 76. Within this sector the web 78 is discontinuous and defines a pair of generally triangular-shaped tabs 86 through which circular locator openings 88 are defined. The locator openings 88 are set just within the inner surface 74 of the hub rim 70.

The flat, planar members 22 that define the hub-engaging region 30, the spokes 32, and the retaining member rim 28 also define radially inwardly directed film-end access gaps 89. The film-end access gaps 89 are angularly offset from the radial alignment of both the pair of diametrically opposed prongs 50 and 52 and the diametrically opposed channels 38 in the axial portion 34 of the retaining member 12 and 14 by an angle of forty-five degrees, as best depicted in FIGS. 4, 6, and 8.

Figure 4:
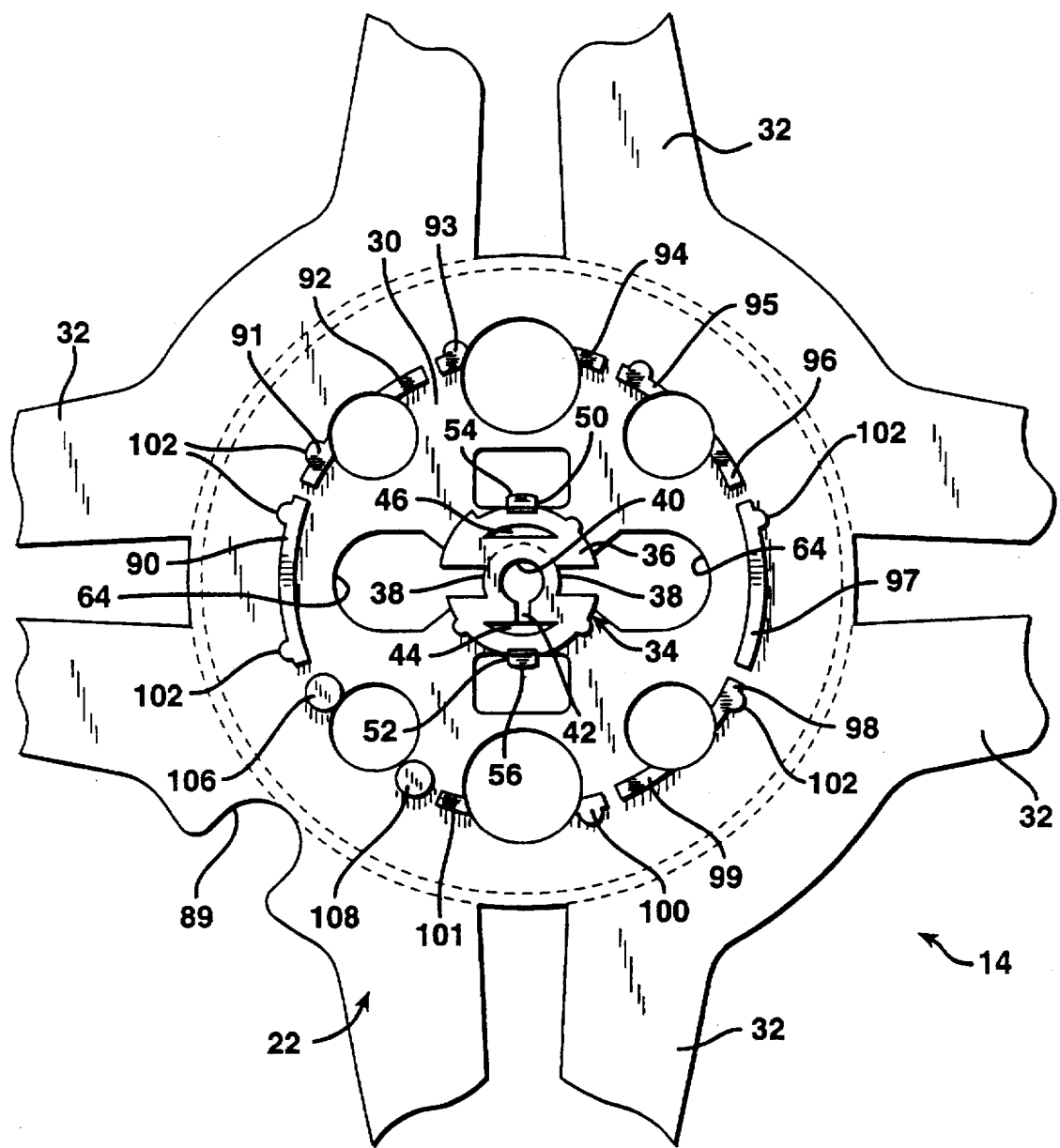
FIG. 4 is a top plan view of FIG. 3.

On their inner surfaces, best shown in FIGS. 3 and 4, the hub-engaging regions 30 of the retaining members 12 and 14 include centering projections in the form of short walls and posts 90–101. The walls and posts 90–101 define thereon radially outwardly directed protrusions 102 which are of a semicircular cross sectional configuration. The walls and posts 90–101 with the protrusions 102 thereon serve as centering projections that extend away from the planar, hub-engaging portions 30 of the retaining members 12 and 14. These centering projections 90–102 engage the hub rim 70 radially interiorly of the outer surface 72 of the rim 70 of the hub 16. The protrusions 102 serve to frictionally engage the inner, cylindrical wall 74 of the hub rim 70 so as to hold the central, axial opening 68 in the hub 16 in coaxial alignment with the axis 24 of the two retaining members 12 and 14.

Between the wall 90 and the post 101 the retaining members 12 and 14 both define a pair of positioning or locator posts 106 and 108 that are located radially inwardly from and on opposites sides of the film-end access gaps 89. The locator posts 106 and 108 are mutually parallel to each other. They are of equal height and project out away from the inner surface of the hub-engaging region 30 and are oriented perpendicular relative thereto. The locator posts 106 and 108 extend exactly half the distance between the two retaining members 12 and 14, which is exactly half the thickness of the hub 16, when the motion picture film reel 10 is fully assembled. Due to the thickness of the web 78, the locator posts 106 and 108, together with the web 78, comprise interfering elements that prevent engagement of the catches 54 and 56 of the prongs 50 and 52 unless the pairs of prongs 50 and 52 on each of the retaining members 12 and 14 are angularly offset from each other by ninety degrees and unless the film-end access gaps 89 of the two retaining members 12 and 14 are also longitudinally aligned with each other.

The locator posts 106 and 108 project away from the hub-engaging regions 30 of both of the retaining members 12 and 14. The locator openings 88 in the tabs 86 of the transverse web 78 receive the locator pins 106 and 108 from both of the retaining members 12 and 14 from opposite sides of the web 78 only when the retaining members 12 and 14 are angularly offset from each other by ninety degrees in the direction that brings the film-end access gaps 89 into longitudinal alignment with the film insertion slot 82 in the hub 16. When the pairs of prongs 50 and 52 of the retaining members 12 and 14 are aligned at right angles to each other in this manner and when the film-end access gaps 89 are also longitudinally aligned with each other, the positioning pins 106 and 108 of each of the retaining members 12 and 14 extend half way through the thickness of the tabs 86.

The retaining elements 12 and 14 and the hub 16 are shown completely disassembled from each other in FIG. 1. To assemble the motion picture reel 10 together, the hub 16 is first pressed toward the facing axial portion 34 of either of the retaining members 12 or 14. It is immaterial as to which of the opposing surfaces 18 and 20 of the hub 16 faces either the retaining member 14 or the retaining member 12.

As shown in FIG. 5, for example, the hub 16 may be pressed toward the hub-engaging region 30 of the retaining member 14. It is very important, however, for the film insertion slot 82 in the rim 70 of the hub 16 to be angularly aligned with the film-end access gap 89 in the retaining member 12 or 14 with which the hub 16 is first engaged. This is because it is only when the retaining member 12 or 14 and the hub 16 are in this alignment that the locator posts 106 and 108 will enter the locator openings 88 in the tabs 86. If the hub 16 resides at any other angle of rotation relative to either retaining member 12 or 14, the tips of the locator posts 106 and 108 will interfere with the structure of the web 78, and prevent the surface 20 of the hub 16 from making contact with the facing inner surface of the hub-engaging region 30 of the retaining member 14.

As the hub 16 is pressed toward the retaining member 14, the outwardly inclined cam surfaces 58 of the catches 54 and 56 formed on the distal extremities of the prongs 50 and 52 are resiliently directed inwardly within the confines of the central, axial opening 68 in the core 66 of the hub 16. The catches 54 and 56 of the prongs 50 and 52 extending from the retaining member 14 are thereby resiliently deflected inwardly to permit the core 66 to approach the inner surface of the hub-engaging region 30 and slide smoothly along the ribs on the cylindrical surface of the base 36 of the axial portion 34 of the retaining member 14.

If the hub 16 is properly aligned relative to the retaining member 14, the tips of the positioning posts 106 and 108 will enter the locator openings 88 in the tabs 86, thus permitting surface 20 of the hub 16 to contact the inner face of the hub-engaging region 30 of the retaining member 14. As the surface 20 approaches the hub-engaging region 30, the wall, posts, and protrusions 90–102 ensure that the core 66 of the hub 16 is centered in coaxial alignment with the central, axial opening 40 in the axial portion 34 of the retaining member 14.

The catches 54 and 56 on the tips of the prongs of each of the pairs of prongs are directed radially outwardly, one from another, to engage the latching ledges formed by the annular edge of the core 66 at the surface 18 of the hub 16. As the surface 20 of the hub 16 reaches the hub-engaging region 30, the bearing surfaces 60 of the catches 54 and 56 of the prongs 50 and 52 clear the upper surface 18 of the hub 16. Due to their resilient deflection, the prongs 50 and 52 thereupon spring radially outwardly from each other so that the bearing surfaces 60 of the catches 54 and 56 engage the latching ledge formed by the surface 18 at the upper edge of the core 66. The catches 54 and 56 on the ends of the prongs 50 and 52 of the retaining member 14 thereby firmly, but releasable engage the hub 16 due to their overhanging relationship relative to the end of the core 66 at the surface 18 of the hub 16.

The retaining member 12 is then disposed in a position in which the axial portion 34 thereof is directed toward the central, axial opening 68 in the core 66 of the hub 16, as illustrated in FIG. 5. It is important for the film-end access gap 89 of the retaining member 12 to be angularly aligned with both the film-end access gap 89 of the retaining member 14 and the film insertion slot 82 of the hub rim 70.

It is only with this orientation that the pair of prongs 50 and 52 of the retaining member 12 are aligned at a ninety degree angular offset from the alignment of the pair of prongs 50 and 52 of the retaining member 14.

The retaining member 12 is then pressed toward the hub 16. Again, the catches 54 and 56 on the prongs 50 and 52 thereof are deflected radially inwardly as the cam surfaces 58 contact the surface 18 at the edge of the core 66. When the pairs of prongs 50 and 52 of the respective retaining members 12 and 14 are angularly offset ninety degrees from each other, the pairs of prongs of each retaining member will be angularly aligned with the channels 38 defined in the axial portion 34 of the other retaining member. Thus, the channels 38 form diametrically opposing prong receiving passages. The prong receiving passages formed by the channels 38 of each retaining member engage the prongs 50 and 52 of the other retaining member and prevent relative rotation between the retaining members 12 and 14.

Figure 7:
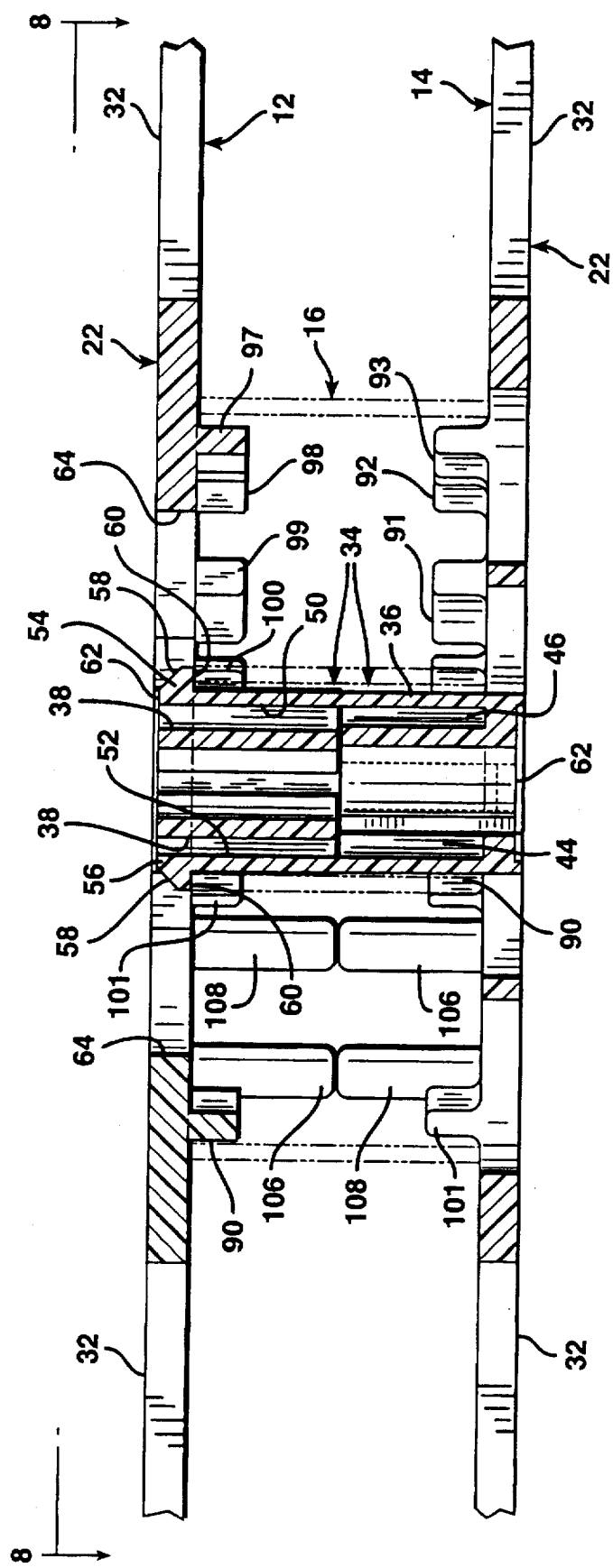
FIG. 7 is a sectional elevational detail of the centers of the retaining members, both engaged with the hub of the reel with the hub shown in phantom.

As the retaining member 12 is pressed toward the hub 16 and retaining member 14, the prongs of each retaining member travel longitudinally along the channels 38 of the other retaining member. With proper alignment between the retaining members 12 and 14, the tips of the positioning posts 106 and 108 of the retaining member 12 will enter the locator openings 88 in the tabs 86 from the top, as viewed in FIG. 7, thereby permitting contact to be established between the surface 18 of the hub 16 and the inner face of the hub-engaging region 30 of the retaining member 12. When this occurs the catches 54 and 56 of the prongs 50 and 52 of the retaining member 12 clear the surface 20 of hub 16 at the edge of the core 66. The resiliency of the prongs 50 and 52 thereupon causes the prongs to spring radially outwardly, thereby engaging the bearing surfaces 60 of the catches 54 and 56 of the retaining member 12 with the latching ledge formed by the end surface 20 of the edge of the core 66. All of the components of the motion picture reel 10 are then fully engaged, as illustrated in FIGS. 7 and 8.

The motion picture reel 10 of the invention may be disassembled just as easily as it is assembled. To disassemble the retaining members 12 and 14 from the hub 16, the user merely places the tips of the thumb and index finger into the catch access openings 64 of one retaining member in order to permit the catches 54 and 56 of the other retaining member to be resiliently compressed together and toward the axis 24 of the motion picture reel 10. With the catches 54 and 56 pressed together using thumb and forefinger, the user concurrently pulls the retaining member into which the thumb and forefinger have been inserted away from the other retaining member. Only a slight axial movement of one retaining member away from the other will cause the catches 54 and 56 that were pressed together to clear the latching ledges with which they were engaged and enter the central, axial opening 68 of the core 66 of the hub 16. With either or both of the retaining members separated from the hub 16, the film can be drawn axially off of the hub 16 for destruction.

It should be noted that the retaining members 12 and 14 are structurally identical to each other, even though they are disposed in mirror image relationship. This is possible only because the pair of prongs 50 and 52 of each retaining member are oriented at a ninety-degree angular offset from the pair of prongs in the other retaining member. Thus, there are only two structurally different types of parts employed in the motion picture reel 10, namely the retaining member part and the hub part.

Undoubtedly, numerous variations and modifications of the invention will become readily apparent to those familiar with motion picture film reels. Accordingly, the scope of the invention should not be construed as limited to this specific embodiment depicted and described.

We claim:

1. A motion picture film reel comprising separate components that are releasably engageable together including:

a pair of side retainers each formed with a flat, planar member having an outer retainer rim with a circular perimeter and a hub-engaging region defining an axis and centered within said rim and each of said side retainers includes a pair of resilient prongs each prong defining a catch thereon extending out of the plane of said flat, planar member, said prongs in each pair being located diametrically opposite each other within their respective hub regions, and said pairs of prongs of said pair of said side retainers are angularly offset from each other by ninety degrees, and a disk-shaped hub having opposing sides and defining at least one central, axial aperture therethrough for receiving said resilient prongs from both of said opposing sides and said hub further defines latching ledges for releasably engaging said catches on said prongs, and wherein all of said prongs pass through said central, axial aperture in said hub, and said catches on said prongs in each of said pairs of prongs are directed radially outwardly and said prongs have distal tips remote from said hub-engaging regions that define cam surfaces, whereby said prongs in each pair of prongs are deflected radially inwardly toward each other as said distal tips thereof enter said central, axial aperture of said hub, and resiliently spring radially outwardly when said catches reach said latching ledges.

2. A motion picture fill reel comprising: a pair of retaining members each formed with a flat side cheek-plate member having a central axis of rotation and each of which defines a retainer rim with an outer circular perimeter, a central, hub-engaging region, and each retaining member has a pair of resilient prongs each having a latching catch thereon, whereby said prongs extend outwardly from said cheek plates and perpendicular thereto, and said prongs in each pair are located diametrically opposite each other, and further comprising a disk-shaped hub having opposite sides and a hollow center and latching ledges on both of said opposite sides, whereby said prongs extend into said hollow center of said hub from said opposite sides thereof so that said catches on said prongs releasably engage said latching ledges on said opposite sides of said hub, and said pairs of prongs of said retaining members are angularly offset from each other by ninety degrees when said catches engage said latching ledges, and further comprising interfering elements on said retaining members and on said hub that prevent engagement of said catches with said latching ledges unless said pairs of prongs are angularly offset from each other by ninety degrees.

3. A motion picture film reel comprising separate components that are releasably engageable together including:

a pair of side retainers each formed with a flat, planar member having an outer retainer rim with a circular perimeter and a hub-engaging region defining an axis and centered within said rim and each of said side retainers includes a pair of resilient prongs each prong defining a catch thereon extending out of the plane of said flat, planar member, said prongs in each pair being located diametrically opposite each other within their respective hub-engaging regions, and a disk-shaped hub having opposing sides and having a central core that defines at least one central, axial aperture therethrough for receiving said resilient prongs from both of said opposing sides, a hub rim having a cylindrical outer surface surrounding said core, said hub further defining latching ledges for releasably engaging said catches on said prongs, and a web that joins said core to said rim and which is oriented perpendicular thereto, and further comprising at least one locator aperture formed through said web, and said hub-engaging regions of both of said flat planar members of said pair of side retainers are each provided with at least one locator pin extending out of the planes of their respective flat planar members, and wherein all of said prongs pass through said central, axial aperture in said hub, and said pairs of prongs of said pair of said side retainers are angularly offset from each other by ninety degrees, and whereby said locator pins fit into said locator apertures when said pairs of said prongs are angularly offset as aforesaid to thereby permit said catches on said prongs to engage said latching ledges, and said web otherwise interferes with advancement of said locator pins through said hub to prevent said catches from engaging said latching ledges.

4. A motion picture film reel according to claim 3 further comprising centering projections extending out of the planes of said flat, planar members that engage said rim so as to center said hub coaxially relative to said hub-engaging regions of said flat, planar members.

5. A motion picture film reel according to claim 3 wherein said rim defines a longitudinal film insertion slot in said cylindrical, outer surface, and each of said flat planar members defines a film-end access gap therein angularly offset from the diametric alignment of said pair of prongs extending out of the plane thereof, whereby said film-end access gaps in both said retainer members reside in angular alignment with each other and with said film insertion slot when said catches are engaged with said latching ledges as aforesaid.

6. A motion picture film reel according to claim 5 wherein said side retainers are identical in structure.

7. A motion picture film reel according to claim 3 wherein said side retainers are structurally identical.

8. A motion picture reel having an axis of rotation and formed of separable and releasably engageable components including: a pair of laterally confining retaining members each including a planar portion that defines a central, hub-engaging region, spokes radiating from said hub-engaging region, and a retainer rim having a circular perimeter concentrically surrounding said hub-engaging region and an axial portion having a pair of resilient prongs projecting away from said hub-engaging region each prong including a catch thereon, and said prongs of each of said retaining members are disposed at diametrically opposing positions relative to said axis of rotation on their respective hub-engaging regions, and said pairs of prongs of each of said retaining members are angularly offset ninety degrees from said pairs of prongs of the other retaining member, and said axial portions of said laterally confining members both include an annular base projecting away from said hub-engaging regions and beyond which said prongs project further from said hub-engaging regions, and said bases both define a pair of diametrically opposing, prong-receiving passages, whereby said prong receiving passages of each retaining member engage said prongs of the other retaining member and thereby prevent relative rotation between said retaining members and a hub with opposing sides having a cylindrical outer surface and defining at least one opening for receiving said prongs of said retaining members therethrough from said opposing sides of said hub, and wherein said hub defines latching ledges for releasably engaging said catches on said prongs.

9. A motion picture reel according to claim 8 wherein said prongs in each pair both terminate in distal tips remote from their respective hub-engaging regions, and said catches are defined on said distal tips of said prongs and said catches on each of said pairs of prongs are directed radially outwardly, one from another to engage said latching ledges on said hub.

10. A motion picture reel according to claim 9 wherein said distal tips of said prongs define cam surfaces that resiliently and radially deflect said prongs toward each other as they are inserted from said opposing sides of said hub, and wherein said hub has a single, central, axial opening through which all of said prongs pass and said latches are formed by the structure of said hub on both of said opposing sides adjacent said central, axial opening through said hub.

11. A motion picture reel according to claim 10 wherein said hub-engaging regions of said retaining members include centering projections extending away from said planar portion and which engage said hub so as to hold said central, axial opening in said hub in coaxial alignment with said axis of rotation.

12. A motion picture reel according to claim 11 wherein said hub defines a core through which said central, axial opening is formed, an annular hub rim having an outer surface and set radially outwardly from said core, and a web extending between said core and said hub rim, whereby said centering projections engage said hub rim radially interiorly of said outer surface of said hub rim.

13. A motion picture reel according to claim 12 further comprising locator pins projecting away from said hub-engaging regions of both of said retaining members, and locator openings in said hub that receive said locator pins from both of said retaining members only when said retaining members are angularly offset from each other by ninety degrees.

14. A motion picture reel according to claim 8 further characterized in that said retaining members are identical to each other in construction.

* * * * *